Dec. 25, 1934.   J. H. VICTOR ET AL   1,985,474
GREASE RETAINER
Filed Nov. 2, 1932
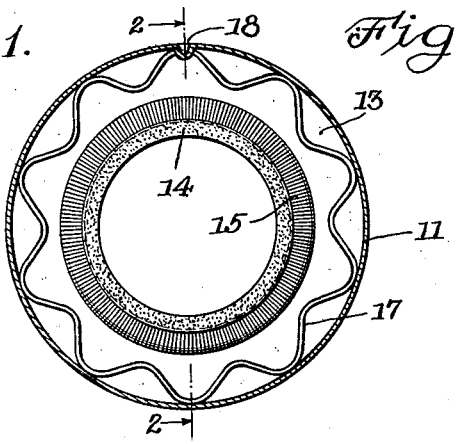
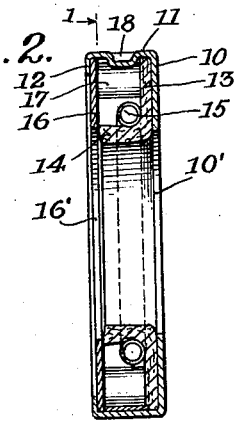
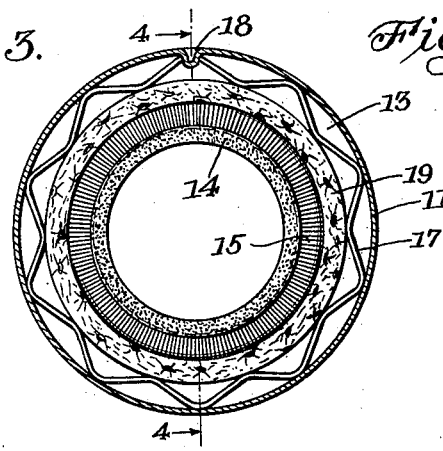
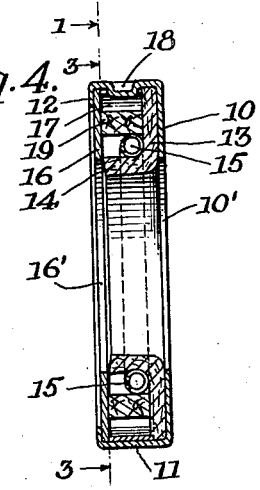
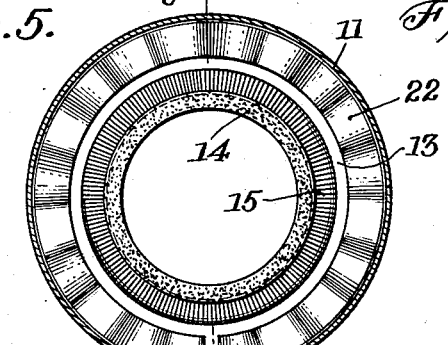
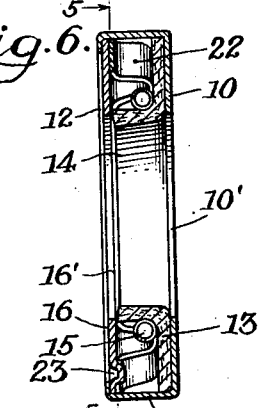
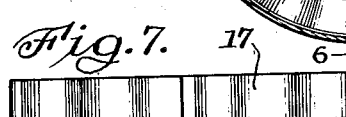
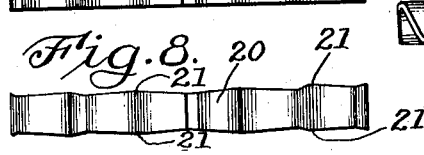
INVENTORS
John H. Victor,
Marc L. Liston, and
Casmer Maturak
BY
ATTORNEY Patented Dec. 25, 1934

1,985,474

UNITED STATES PATENT OFFICE 1,985,474

GREASE RETAINER

John H. Victor, Evanston, Marc L. Liston, Elmhurst, and Casmer Matusak, Cicero, Ill., assignors to Victor Manufacturing & Gasket Company, Chicago, Ill., a corporation of Illinois Application November 2, 1932, Serial No. 640,796

2 Claims. (Cl. 288—1)

This invention relates to grease retainers for shafts and one of its principal uses is to prevent the escape of oil and grease about the shaft in a rear axle housing of an automobile.

The object of the invention generally is to provide a novel grease retainer of simple construction which will hug the shaft closely and yield sufficiently to permit it to float as required in service and at the same time effectively prevent the escape of oil and grease.

And another object of the invention is to clamp the packing in the shell against relative rotative movement and to distribute the clamping effect over a wide area of the packing to insure an effective clamp.

In the accompanying drawing we have illustrated selected embodiments of the invention and referring thereto, Fig. 1 is a sectional view on the line 1—1 of Fig. 2.

Fig. 2 is a sectional view on the line 2—2 of Fig. 1.

Fig. 3 is a sectional view on the line 3—3 of Fig. 4.

Fig. 4 is a sectional view on the line 4—4 of Fig. 3.

Fig. 5 is a sectional view on the line 5—5 of Fig. 6.

Fig. 6 is a sectional view on the line 6—6 of Fig. 5.

Figs. 7 and 8 are detail views of different forms of the clamping ring shown in Figs. 1-4.

Fig. 9 is a detail view of the clamping ring shown in Fig. 5.

Referring to the drawing, the retainer comprises a cup-shaped shell having a side 10, a rim 11 and an inturned flange 12. A packing of leather or other suitable material has a flat portion 13 which is seated against the side 10 of the shell and a tubular portion 14 which engages the shaft.

In Figs. 1 and 2, a coil spring 15 is arranged around the tubular portion 14 of the packing to hold the same snugly but yieldingly in contact with the shaft. A washer 16 is held in the shell by the flange 12 and forms, in effect, one side of the shell. The side 10 of the shell has an opening 10' and the washer 16 has an opening 16' which are somewhat larger than the opening in the tubular portion 14 of the packing so that they will not contact with the shaft in any expected movement thereof in the retainer. It is important to hold the flat portion of the packing rigidly in place in the retainer so that it will not be caused by the shaft to revolve therewith or relatively to the shell and for this purpose we provide a sinuous ring 17 consisting of a metal strip bent reversely to wavy or sinuous form. This ring is arranged within the shell between the rim and the coil spring 15 and it is held tightly against the flat portion of the packing by the washer 16 and the flange 12. The sinuous clamping ring has free ends which engage a stop projection 18 on the inner side of the rim of the shell to prevent the ring from rotating in the shell. This projection can be conveniently formed by indenting the rim as shown. The clamping ring is preferably made to fit within the shell in contact with the rim thereof but spaced from the coil spring 15 so that it will not interfere with the operation of this spring. When the parts are assembled, the washer 16 is pressed forcibly against one edge of the clamping ring to cause the other edge of the ring to indent itself in the flat portion of the packing. By reason of the fact that the clamping ring is sinuous or wavy in outline, it engages the packing over a considerable width of its flat portion and causes a corresponding sinuous or wavy indentation in the packing in which the clamping ring seats itself. Therefore, the clamping ring clamps the flat portion of the packing over a wide annular area and serves to hold the packing securely and non-rotataively in the shell. Furthermore, the clamping ring is forced under pressure to indent or dig into the packing in a meander line when the parts are assembled and in this position the flange 12 is turned over upon the washer to hold the clamping ring in this position. The washer thus forms one side of the shell and the sinuous or wavy engagement of the clamping ring with the packing assists in preventing the rotative movement of the packing in the shell.

In Figs. 3 and 4 we have shown a cork ring 19 interposed between the coil spring and the clamping ring. This cork ring is preferably treated suitably to make it water, oil and grease proof. The cork ring is confined snugly between the washer and the flat portion of the packing and it prevents grease and oil from passing into that part of the shell which contains the clamping ring. The position of the coil spring and the cork ring in the shell may be reversed but we prefer having the coil spring within the cork ring, as shown, rather than having the cork ring within the coil spring because in the latter arrangement the coil spring may dig into the cork ring and damage it and destroy its effectiveness.

The clamping ring 17 heretofore described and shown in Fig. 7 has parallel edges but we may use a clamping ring 20, Fig. 8, having projections 21 at its side edges which will make deeper indentations in the packing. In both forms of the packing rings 17 and 20, the waves or undulations are radial of the ring and the retainer but we may bend the strip to provide a clamping ring 22, Figs. 5, 6 and 9, in which the waves or undulations extend axially of the clamping ring and the retainer. In the form of ring shown in Figs. 7 and 8, the edges engage the washer and the packing but, in the form of ring shown in Fig. 9, the sides of the ring engage the washer and the packing and, instead of providing the stop projection on the rim of the shell, we provide a stop projection 23 on the washer to be engaged by the ends of the clamping ring 22.

The invention provides a novel retainer of simple construction which will effectively prevent the escape of grease and oil along the shaft upon which it is mounted. The clamping ring distributes its clamping action over a wide area of the flat portion of the packing and tightly clamps it against the side of the shell and prevents it from moving rotatively within the shell. The spring exerts its tension upon the tubular portion 14 of the packing to hold it in snug contact at all times with the shaft and the cork ring, Figs. 3 and 4, provides a seal in the shell which prevents grease and oil from passing into the outer part of the shell where the clamping ring is confined and thereby avoids the possibility of grease and oil working around the outer edge of the packing and between the flat portion of the packing and the side 10 of the shell and escaping from the retainer.

We have shown and described the invention in selected embodiments of commercial forms but we reserve the right to make changes in the form, construction and arrangement of parts to adapt our invention for different uses and for other reasons within the scope of the following claims.

We claim:

1. A grease retainer having an opening to receive a shaft and comprising a shell, a packing arranged in the shell to engage the shaft, a projection on the shell extending inwardly thereof, and a sinuous clamping ring engaging the packing to retain it against rotative movement within the shell and having free ends which engage said projection to prevent rotative movement of the clamping ring within the shell.

2. A grease retainer having an opening to receive a shaft and comprising a shell, a packing arranged in the shell and having a flat portion engaging one side of the shell and a tubular portion to receive the shaft, a clamping ring within the shell between the flat portion of the packing and the other side of the shell and engaging the packing in a meander line to extend the clamping effect over a wide area of the flat portion of the packing, a coil spring enclosing the tubular portion of the packing, and a cork ring arranged in the shell between the coil spring and the clamping ring and forming a seal to prevent the passage of grease into the clamping ring part of the shell.

JOHN H. VICTOR.
MARC L. LISTON.
CASMER MATUSAK.